US00RE37014E

(19) United States
(12) Reissued Patent
Guillard et al.

(10) Patent Number: US RE37,014 E
(45) Date of Reissued Patent: Jan. 16, 2001

(54) COMBINED INSTALLATION OF A METAL PRODUCTION UNIT AND A UNIT FOR THE SEPARATION OF AIR GAS

(75) Inventors: Alain Guillard, Paris; Marc Buffenoir, Voisins le Bretonneux; Daniel Deloche, Meudon, all of (FR)

(73) Assignee: L'Air Liquide, Societe Anonyme pour l'Etude et l'Exploitation des Procedes Georges, Paris (FR)

(21) Appl. No.: 09/119,629

(22) Filed: Jul. 21, 1998

Related U.S. Patent Documents

Reissue of:
(64) Patent No.: 5,538,534
Issued: Jul. 23, 1996
Appl. No.: 08/340,368
Filed: Nov. 14, 1994

(30) Foreign Application Priority Data

Nov. 12, 1993 (FR) ..... 93 13521

(51) Int. Cl.[7] ..... C21B 5/00
(52) U.S. Cl. ..... 75/466; 266/144; 266/156
(58) Field of Search ..... 75/466, 958; 266/144, 266/145, 156, 160; 62/24

(56) References Cited

U.S. PATENT DOCUMENTS

| | | | | |
|---|---|---|---|---|
| 1,445,973 | | 2/1923 | Roberts et al. . | |
| 2,079,019 | | 5/1937 | Karwat et al. . | |
| 3,241,327 | * | 3/1966 | La Fleur | 62/24 |
| 3,304,074 | | 2/1967 | Atherton . | |
| 4,962,646 | * | 10/1990 | Rathbone | 62/24 |
| 5,076,837 | * | 12/1991 | Rathbone | 75/433 |
| 5,244,489 | | 9/1993 | Grenier . | |

FOREIGN PATENT DOCUMENTS

| | | | |
|---|---|---|---|
| 3114 842 A1 | | 10/1982 | (DE) . |
| 3114842 | * | 10/1982 | (DE) . |
| 42 19 160 | | 12/1992 | (DE) . |
| 0532429 | * | 3/1993 | (EP) . |
| 2266344 | * | 10/1993 | (GB) . |
| 2 266 344 | | 10/1993 | (GB) . |
| 61-139609 | | 6/1986 | (JP) . |

OTHER PUBLICATIONS

Chater et al, "Recent Advantages with Oxygen in Iron and Steel Making," Butterworths, Washington, Dec. 1964, pp. 9–13;.

Springmann, "The Planning of Large Oxygen Plants in Steel Works," Dec. 1976, pp. 1–13.

Maschlanka, "COREX, A New Iron Source for EAF–Steelmaking," 16$^{th}$ Advanced Technology Symposium Alternative Iron Sources for the EAF, May 2–5, 1993, Myrtle Beach, SC, USA;.

Lankford, Jr. et al, "The Making, Shaping and Treating of Steel," Tenth Edition, Herbick & Held, Pittsburgh, Pennsylvania, USA Dec. 1985, pp. 2, 351, 352, 575, 576, 599, 759;.

Specialized article "Zur Planung grosser; Sauerstoffanlagen in Stahlwerken [about the planning of large oxygen plants in steelworks]" from Lind–Berichte aus Technik und Wissenschaft [Linde reports from Technology and Science], No. 40 (Dec. 1976), pp. 24 to 29;.

(List continued on next page.)

*Primary Examiner*—Scott Kastler
(74) *Attorney, Agent, or Firm*—Burns. Doane, Swecker & Mathis, L.L.P.

(57) ABSTRACT

The combined installation comprises at least one metal production unit (II), including at least one, and typically a series of metal production or treatment units (1–6), and at least one air gas separation unit (III) including at least one outlet for at least one air gas (14–18), the units being supplied with compressed air with a low water vapor content by a common compressed air production unit (I), and with at least one of the gas outlets (14–18) from the separation unit (III) connected to at least one of the devices (1–6) of the production unit, to supply the latter with gas.

54 Claims, 2 Drawing Sheets

OTHER PUBLICATIONS

Section "Druckluftversorgung [Compressed–air supply]" from Ullmanns Encyklopädie der technischen Chemie [Ullmann's Encyclopaedia of Industrial Chemistry], 4$^{th}$ Edition, vol. 2, Dec. 1972, pp. 357 and 358;.*

Section "Ausfuhrung und Betrieb der Anlagen zur Gasverflussigung [Design and operation of the plants for gas liquefaction and separation of gas mixtures] . . . " from the handbook "Tieftemperaturtechnik [Low–temperature technology]", Dec. 1985, pp. 441–443, and English language translation thereof.*

* cited by examiner

COMBINED INSTALLATION OF A METAL PRODUCTION UNIT AND A UNIT FOR THE SEPARATION OF AIR GAS

Matter enclosed in heavy brackets [ ] appears in the original patent but forms no part of this reissue specification; matter printed in italics indicates the additions made by reissue.

FIELD OF THE INVENTION

The present invention concerns a combined installation consisting of at least one unit for the production of at least one metal, comprising at least one device for the production or treatment of metal, and at least one unit for the separation of gas from the air, with at least one outlet for at least one air gas.

BACKGROUND OF THE INVENTION

Metal production units, in particular for steel, at present integrate several metal production or treatment devices, if necessary regrouping them in a complete production line that extends from the treatment of the raw mineral to the production of finished products ready for marketing. Most of these metal production or treatment devices consume large quantities of compressed air (over 100 $Nm^3$ of air per ton of metal) and/or gas from the air, notably oxygen (over 50 $Nm^3$ per ton of metal) and/or a neutral gas (over 10 $Nm^3$ per ton of metal). These air gases are generally supplied from liquefied gas containers or by gas pipelines. Besides, these air gases are produced by units for the separation of air gases, notably of the cryogenic type, which are also supplied with compressed air. Whether for the metal production or treatment devices or for the air gas separation units, the air compressors used are particularly heavy-duty items of equipment that consume a great deal of electrical energy, and because of this, considerably increase the production costs of such units.

SUMMARY OF THE INVENTION

The aim of the present invention is to propose a combined installation comprising at least one metal production unit and at least one unit for the separation of air gas, which will optimize the synergism between these units, notably by sharing a compressed air production unit and by the direct, on-site coupling of metal production or treatment units with the sources of air gas offered by the air gas separation unit.

To this end, in accordance with one characteristic of the invention, the combined installation comprises a compressed air production unit having at least one outlet connected to an air gas separation unit and to the said production or treatment unit, to supply these latter with air.

In accordance with another characteristic of the invention, the installation comprises at least one fluid pipeline connecting the outlet of the separation unit to the said device and supplying at least one air gas, in gaseous or liquid form, to the latter.

The present invention also aims to propose a combined installation of the above type which also makes use of the thermal synergism between the two units, notably the refrigeration power offered by a separation unit, in particular of the cryogenic type.

To this end, in accordance with a characteristic of the invention, the metal production or treatment unit comprises at least one cooling circuit, at least one part of which is functionally associated with at least one fluid circuit of the cryogenic air gas separation unit.

A further aim of the invention is the optimization of a cryogenic separation unit supplied with excess compressed air.

BRIEF DESCRIPTION OF THE DRAWINGS

Other characteristics and advantages of the present invention will emerge from the following description of design options, which are presented for illustrative purposes but are in no way limiting, and which refer to the attached drawings, in which.

DETAILED DESCRIPTION OF THE INVENTION

Figure 1:
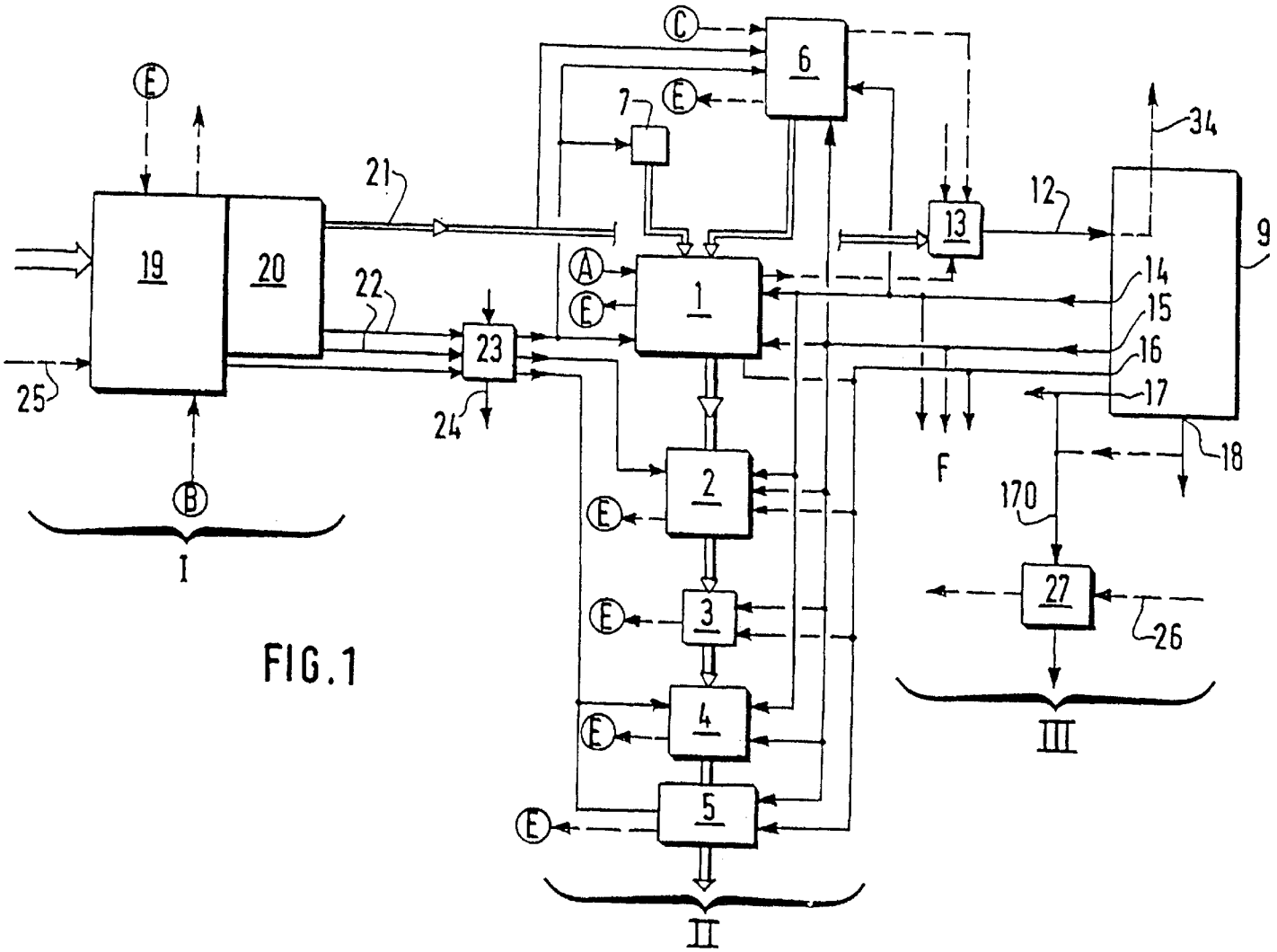
FIG. 1 is a schematic view of a design option for a combined installation according to the invention, which groups together a steel production line and a cryogenic air gas separation unit.

In the description that follows and in the drawings, identical or analogous elements are designated with the same reference numbers, if necessary indexed.

In the design option represented schematically in FIG. 1, three mutually cooperating main groups are shown, namely a high and medium pressure group for the production of compressed air I, a steel production line II, and a cryogenic air gas separation unit III, in this case of the cryogenic type.

In the example shown, the line II comprises a steel melting furnace 1, typically an EAF arc furnace or an EOF tuyere and burner-type furnace, whose molten metal is transferred to a converter-type device 2 for the treatment or composition adjustment of the molten steel, typically an AOD ("argon oxygen decarburization") or a BOF ("basic oxygen furnace"), which is then transferred via a continuous casting unit 3 and a continuous reheating furnace 4, to a rolling mill 5. The furnace 1 is charged with steel, either directly from a device 6 of the blast furnace, or COREX, or DRT direct reduction type for the reduction or pre-reduction of iron ore, or with scrap iron from a scrap sorting device 7. The cryogenic air gas separation unit III comprises typically at least one double-distillation column 9 which, as shown in FIG. 3, includes a medium-pressure column 10 and a low-pressure column 11 and, advantageously, an argon mixture column (not shown), which is supplied with compressed air under a pressure of at least $4\times10^5$ Pa, typically between 6 and $35\times10^5$ Pa, by a compressed air supply line 12 incorporating an adsorption-type purifier device 13. In the example shown, the separation unit comprises at least one pure oxygen outlet 14, an outlet for largely pure nitrogen 15, an outlet for largely pure argon 16, an outlet for residual gases 17 (generally impure nitrogen), and an additional outlet for cryogenic fluid 18, for example liquid or gaseous nitrogen or liquid air.

In accordance with one aspect of the invention, the groups II and III are supplied with compressed air by a common compressor group I comprising a line of compressors 19 with several outlets, at least some of which are connected to an oil precipitation and drying group 20, which supplies at least compressed air at high pressure (typically in excess of $6\times10^5$ Pa) to at least one pipeline 21, and advantageously at least air compressed to medium pressure (between 3 and $6\times10^5$ Pa), to a series of pipelines 22. The pipeline 21 is directly connected to the pipeline 12, while the pipelines 22 are connected, via a control and if necessary a pressure reduction device 23, to the furnace 1 to feed its burners or tuyeres, to the molten steel treatment device 2 to feed its tuyeres or burners, to the reheating furnace 4 to feed its burners, and to the rolling line 5 to provide air for the vaporization of cooling water, and to supply all these devices with medium-pressure dry air known as "instrument air" for the protection or shielding of control and monitoring equipment associated with these devices, for example temperature probes or television cameras. Medium-pressure air is also fed to the sorting device 7 to supply its sorting air ejection nozzles. Medium-pressure and/or high-pressure air is also directed to the steel reduction or pre-reduction device 6, to supply its tuyeres or burners and/or as instrument air. Medium-pressure dry compressed air may also be supplied from an outlet 24 of the device 23, to a compressed air network for other equipment used in the installation or nearby.

Correlatively, in accordance with an aspect of the invention, the oxygen supplied by group III is directed to the reduction or pre-reduction device 6 to supply its burners or injectors, to furnace 1 to supply the post-combustion burners or tuyeres, to the molten steel treatment device 2 to supply its tuyeres or burners, and to the reheating furnace 4 to supply its burners. Similarly, nitrogen and/or argon are directed to device 1 to carry away carbon particles, to device 2 to produce bubbling, and to devices 3–5, to render them inert or to zone them.

From the above description it will be understood that the essential gases required for the operation of groups II and III are supplied from the compression group I, which in fact transforms the electrical energy brought in by a line 25, to pneumatic energy used in many ways, so permitting a reduction of the production costs with an advantageous electrical energy contract and a large-scale compression group whose yields are therefore higher than the yields of individual compression groups for each group or, as is often the case nowadays, for each of the devices in group II.

In accordance with another aspect of the invention, it is also possible to take advantage of the heat content or the saturable gases available in group III to cool the elements of groups II and if necessary I. As shown in FIG. 1, a cooling water inlet pipeline 26 acting as a direct or indirect heat exchanger is located within an exchanger 27, with a flow of residual or saturable gas available at outlet 17 and/or outlet 18 of the double column 9, and directed by a pipe 170, the water so cooled being directed to input A of the cooling water circuit of furnace 1, or to that part of the cooling circuit of furnace 1 which acts upon its hottest zones, to an input B of cooling water for at least one stage of the compressor line 19, and/or to an input C of cooling water for the reduction or pre-reduction device 6. Synergism between groups II and III may be improved still further by recovering the hot water or steam from water cooling circuit A of furnace 1, from circuit C of the device 6, and/or from cooling circuit B of the compressor line, and directing it to the purification device 13 in order to regenerate its absorption medium.

The hot water or steam emerging from the cooling circuits A to C, and/or the hot compressed air emerging from a stage of the compressor line 19 may also be utilized to vaporize a cryogenic liquid available at the outlet of the separation unit III or, notably in the case of argon not necessarily produced by unit III, supplied from a reservoir, the resultant gas being at least in part fed to the devices of unit II.

In accordance with another design option of the invention, the compressor line 19, at least in part, is of the compressed steam distillation type, the steam being advantageously provided by a steam network E, at least part of which exchanges heat with at least one of the devices 1–6 of the metal production unit II.

In this way, it is possible to make use of the energy produced by the said device (1–6) to form steam, in the classical way. To this end, the steam network E is more particularly connected to at least one among the metal melting furnace 1, the reheating furnace 4, and the ore reduction or pre-reduction device 6.

Figure 2:
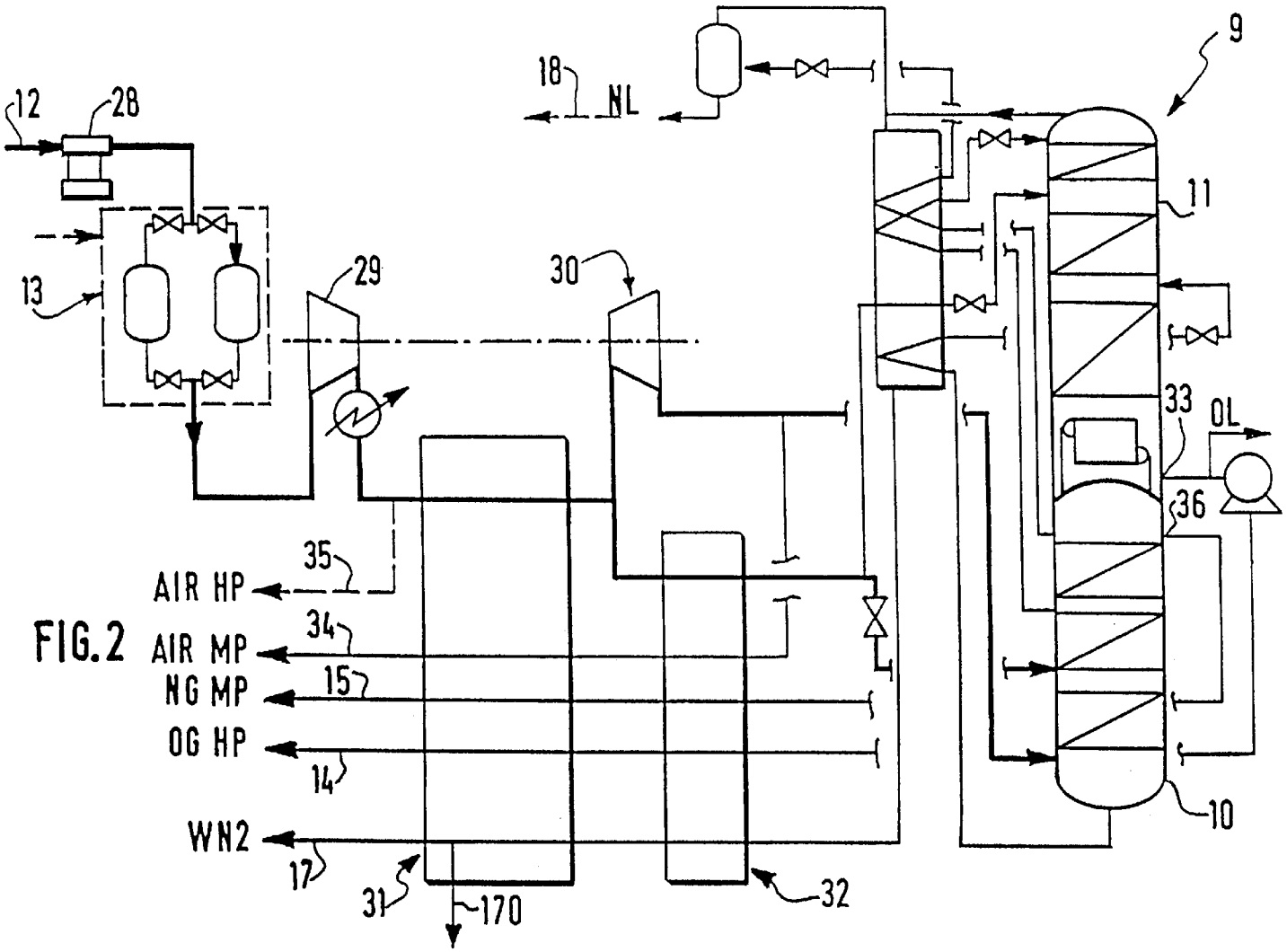
FIG. 2 is a schematic view of a design option for a cryogenic air gas separation unit suitable for use in a combined installation according to the invention.

FIG. 2 shows a particular design option for group III, which makes use of the availability of large quantities of high-pressure air from the outlet of a compressor line of high capacity, used to produce oxygen and nitrogen at least at medium pressure and dried and purified air at least at medium pressure, to supply at least the various devices in group II. The figure shows the high-pressure air supply line 12 comprising, upstream from the purifier 13, a refrigeration group 28, of the mechanical or absorption type. The cooled and purified air is over-compressed by a fan 29 driven by an expansion turbine 30, known as a Claude turbine, which allows expansion of part of the over-compressed air, and is cooled in a first exchange line 31, then passed into the body of the medium-pressure column 10. Part of the over-compressed and cooled air is directed via a second cold exchange line 32 and an expansion valve to an intermediate level of the medium-pressure column and, having been under-cooled, to an upper level of the low-pressure column 11. In this design version, liquid oxygen is extracted at 33, from the body of the medium-pressure column 11, gaseous nitrogen is extracted at 36, at the head of the medium-pressure column 10, and liquid nitrogen is extracted at the head of the medium-pressure column 11. In accordance with one aspect of the invention, the expanded air, typically at a pressure between 5 and $7\times10^5$ Pa at the outlet of the turbine 30, is collected and directed by a line 34 crossing the exchange lines 32 and 31, to the distribution device 23 or directly to some of the devices of group II. The expansion of this supplementary air not introduced into the double column 9 allows the production of additional cold, which is used to increase the production of the cryogenic liquids in the double column 9, and this, with notably less specific energy, by virtue of the provision of compressed air by the high-capacity compressor group I. As a result, besides the supplies of gases to the devices of unit II, the cryogenic unit III can, as shown by the network E in FIG. 1, supply at least part of these fluids to other areas where they are used, via pipelines after vaporization, or in bulk form. As a variant, and as also shown in FIG. 2, over-compressed air can also be tapped directly from the line connecting the compressor fan 29 to the expansion turbine 30, upstream from the exchange line 31, to provide a supply, via a line 35, to the distribution device 23 or directly to at least some of the devices of group II.

The installation according to the invention, apart from reducing energy, investment and operating costs, allows optimization within the metal production unit, of each of groups I, II and in such a way as to reduce the ground area occupied and decrease the level of nuisance, notably the overall noise level, produced by the installation. In fact, the installation of the invention permits group I, which is generally noisy, to be localized in a single and unique part of the site chosen for that purpose.

Though the present invention has been described in relation to particular design versions, it is not limited by these but on the contrary, can be modified and varied in any way deemed appropriate by the designer. Notably, the integration may be achieved in a similar way, alternatively, or additionally, with an air gas separation unit of the adsorption or permeation type, producing in this case essentially pure oxygen and/or essentially pure nitrogen instead of a cryogenic unit such as 9 or in parallel with the latter, the two separation units in the latter case being supplied from the same unit I, and with non-ferrous metal production units, notably for copper, nickel, zinc or lead. Similarly, other types of metal production or treatment units (1 to 6) may be incorporated, such as crucible furnaces, degassing units, surface treatments, and dephosphorization or desulfurization treatments.

We claim:

1. A combined installation comprising:

at least one metal processing unit having at least one [air inlet and at least one gas] inlet *for receiving a gas*;

at least one air separation unit having at least one air inlet and at least one gas outlet;

an air compression unit having at least [one] *first and second* compressed air [outlet,] *outlets, said air compression unit comprising a line of commonly driven compressors,* and

*a* first air conduit means extending from said *first* compressed air outlet to the air inlet of said metal processing unit for supplying said metal processing unit with compressed air from said air compression unit, and

*a* second air conduit means extending from said *second* compressed air outlet to the air separation unit for supplying said air separation unit with compressed air from said air compression unit.

2. Installation according to claim 1, wherein the air compression unit includes at least one drying apparatus for drying compressed air.

3. Installation according to claim 1, wherein the metal processing unit includes a metal-sorting device.

4. Installation according to claim 1, wherein the metal processing unit includes a metal melting furnace.

5. Installation according to claim 1, wherein the metal processing unit includes a device for the treatment of molten metal.

6. Installation according to claim 1, wherein the metal processing unit includes a rolling mill.

7. Installation according to claim 6, wherein the metal processing unit further includes a device that supplies the rolling mill with metal.

8. Installation according to claim 1, wherein the metal processing unit includes a device for the reduction or pre-reduction of ore.

9. Installation according to claim 1, wherein the air compression unit includes a line of compressors, and at least part of the line of compressors is driven by a drive unit activated by steam.

10. Installation according to claim 1, further including a steam network (E) at least one part of which functions in a heat-exchange relationship with the metal processing unit.

11. Installation according to claim 1, further comprising at least one gas circuit means extending from said at least one gas outlet of said air separation unit to said gas inlet of said metal processing unit for supplying said metal processing unit with at least one gas separated from air in said separation unit.

12. Installation according to claim 11, wherein the gas inlet of the metal processing unit is fluidly connected to a source of oxygen.

13. Installation according to claim 11, wherein the gas inlet of the metal processing unit is fluidly connected to a source of nitrogen.

14. Installation according to claim 11, wherein the gas inlet of the metal processing unit is fluidly connected to a source of argon.

15. Installation according to claim 11, further comprising at least one cooling circuit for cooling at least one part of at least one unit of said metal processing unit and said air compression unit, said cooling circuit having at least one part in heat exchange relationship with a part of said gas circuit means.

16. Installation according to claim 1, wherein the air separation unit includes, in series, a cryogenic unit and an adsorption purification device having said air inlet and connected to the second air conduit means.

17. Installation according to claim 16, wherein the air separation unit includes a medium-pressure column supplied with over-compressed air expanded in a turbine.

18. Installation according to claim 17, further including a medium-pressure compressed air line tapped off downstream from the turbine to provide a user supply.

19. Installation according to claim 16, further including a cooling circuit having a downstream part connected to the adsorption purification device for the regeneration of its adsorption medium.

20. A method of operating a metal processing plant including at least a first metal processing unit for processing at least one metal while utilizing a flux of air, and at least one air separation unit for supplying at least one gas separated from air to at least one unit in the plant, which comprises providing and operating at least one air compressor unit for separately supplying air under pressure to said first metal processing unit and to said air separation unit *by means of separate outlets in the air compressor, said air compressor unit comprising a line of commonly driven compressors*.

21. The method of claim 20, wherein said at least one separated gas is supplied to at least a second metal processing unit.

22. The method of claim 20, wherein said at least one separated gas is supplied to said first metal processing unit supplied with air under pressure from said air compressor unit.

23. The method of claim 22, wherein said separated gas is oxygen.

24. The method of claim 23, wherein said separated gas further includes nitrogen or argon.

25. The method of claim 20, further comprising the steps of circulating a cooling medium for cooling said at least first metal processing unit, and cooling said cooling medium with said at least one gas supplied by the air separation unit.

26. The method of claim 20, wherein said metal is steel.

27. The method of claim 20, wherein said metal is a non-ferrous metal.

28. The method of claim 20, wherein said separated gas is oxygen.

29. The method of claim 20, wherein said separated gas is nitrogen.

30. The method of claim 20, wherein said separated gas is argon.

*31. The combined installation of claim 1, wherein the second air conduit means includes at least one compression means for overcompressing the air in said second air conduit means being supplied to the air separation unit.*

*32. The combined installation of claim 1, wherein the air compression unit is comprised of means to provide different pressures for the air provided through the first and second compressed air outlets.*

*33. The method of claim 20, wherein the air supplied under pressure to said first metal processing unit is at a*

*different pressure from that of the air supplied under pressure to said air separation unit.*

*34. The method of claim 20, wherein the air supplied to the air separation unit is overcompressed by means of at least one compression means.*

*35. A method of operating a metal processing plant including at least one metal processing unit utilizing at least one flux of air, and at least one air separation unit for supplying at least one gas present in the air to at least one said processing unit in the plant, the method comprising providing and operating at least one air compressor unit for supplying a first flux of air under pressure to said processing unit and a second flux of air to said air separation unit, providing and operating at least one compression means to overcompress the second flux of air, and dividing the overcompressed second flux of air into at least two separate air streams.*

*36. The method of claim 35, wherein at least one of said at least two air streams is effected to have a pressure different from that of said overcompressed second flux of air.*

*37. The method of claim 35, further comprising purifying the second flux of air.*

*38. The method of claim 35, wherein said gas present in the air which gas is supplied by the air separation unit is oxygen.*

*39. As a combined installation comprising:*

*at least one metal processing unit having at least one gas inlet;*

*at least one air separation unit having at least one air inlet and at least one gas outlet;*

*an air compression unit having at least one compressed air outlet;*

*first air conduit means extending from said compressed air outlet to the gas inlet of said metal processing unit, for supplying a first flux of compressed air to said metal processing unit;*

*second air conduit means extending from said compressed air outlet for supplying a second flux of compressed air to the air separation unit, said second air conduit means extending to at least one compression means for overcompressing the second flux of compressed air, said overcompressed second flux of air being divided into at least two separate air streams.*

*40. The installation of claim 39, further comprising means for effecting in at least one of said at least two air streams a pressure different from that of said overcompressed second flux of air.*

*41. The installation of claim 39, wherein the processing unit is a blast furnace.*

*42. The installation of claim 39, wherein said second air conduit means includes at least one air purification device.*

*43. A method of operating a metal processing plant including at least one metal processing unit utilizing at least one flux of air, and at least one air separation unit for supplying at least one gas present in the air to at least one said metal processing unit in the plant, the method comprising providing and operating at least one air compressor unit for supplying a first flux of air under pressure to said transformation unit and a second flux of air to said air separation unit, providing and operating at least one compression means to overcompress the second flux of air, and supplying all of said separated gas to said metal processing unit.*

*44. The method of claim 43, wherein said second flux of air is divided into at least two separate air streams.*

*45. The method of claim 44, wherein at least one of said at least two air streams is effected to have a pressure different from that of said overcompressed second flux of air.*

*46. The method of claim 43, further comprising purifying the second flux of air.*

*47. The method of claim 43, wherein said gas present in the air which gas is supplied by the air separation unit is oxygen.*

*48. A combined installation comprising:*

*at least one raw material transformation unit having at least one inlet for receiving a gas;*

*at least one air separation unit having at least one air inlet and at least one gas outlet;*

*an air compression unit having first and second compressed air outlets, said air compression unit comprising a line of commonly driven compressors, and*

*a first air conduit means extending from said first compressed air outlet to the air inlet of said transformation unit for supplying said transformation unit with compressed air from said compression unit, and*

*a second air conduit means extending from said second compressed air outlet to the air separation unit for supplying said air separation unit with compressed air from said air compression unit.*

*49. A method of operating a material processing plant including at least a first raw material transformation unit for processing at least one raw material while utilizing a flux of air, and at least one air separation unit for supplying at least one unit in the plant, which comprises providing and operating at least one air compressor unit for separately supplying air under pressure to said first transformation unit and to said air separation unit by means of separate outlets in the air compressor, said air compressor unit comprising a line of commonly driven compressors.*

*50. A method of operating a material processing plant including at least one raw material transformation unit utilizing at least one flux of air, and at least one air separation unit for supplying at least one gas separated from air to at least one said transformation unit in the plant, the method comprising providing and operating at least one air compressor unit for supplying a first flux of air under pressure to said processing unit and a second flux of air to said air separation unit, and providing and operating at least one compression means to overcompress the second flux of air, and dividing the overcompressed second flux of air into at least two separate air streams.*

*51. As a combined installation comprising:*

*at least one raw material processing unit having at least one gas inlet;*

*at least one air separation unit having at least one air inlet and at least one gas outlet;*

*an air compression unit having at least one compressed air outlet;*

*first air conduit means extending from said compressed air outlet to the air inlet of said metal processing unit, for supplying a first flux of compressed air to said metal processing unit;*

*second air conduit means extending from said compressed air outlet for supplying a second flux of compressed air to the air separation unit, said second air conduit means extending to at least one compression means for overcompressing the second flux of compressed air, said overcompressed second flux of air being divided into at least two separate air streams.*

*52. A method of operating a material processing plant including at least one raw material transformation unit utilizing at least one flux of air, and at least one air separation unit for supplying at least one gas separated from air to at least one said transformation unit in the plant, the method comprising providing and operating at least one air compressor unit for supplying a first flux of air under pressure to said transformation unit and a second flux of air to said air separation unit, providing and operating at least one compression means to overcompress the second flux of air, and supplying all of said separated gas to said transformation unit.*

*53. The method of claim 35, wherein said separated gas is air.*

*54. The method of claim 43, wherein said separated gas is air.*

* * * * *